Dec. 26, 1961 R. I. HUFFMAN 3,014,257
LOCKING HOOK
Filed March 23, 1959

INVENTOR:
Russell I. Huffman,
BY Bair, Freeman & Molinare
ATTORNEYS.

Patented Dec. 26, 1961

1

3,014,257
LOCKING HOOK
Russell I. Huffman, Strasburg, Ohio, assignor to Knapp-Monarch Company, St. Louis, Mo., a corporation of Delaware
Filed Mar. 23, 1959, Ser. No. 801,312
2 Claims. (Cl. 24—239)

This invention relates to a locking hook and more particularly to a hook that will not be unlatched by vibrations and which is convenient and simple to manipulate with one hand.

Locking hooks generally are old. However, in those instances where a screw-type nut-locking member is used, there are problems involved in that under high frequency vibrations the nut-locking member may work itself to an unlocked position, and may even unhook from the member to which it is hooked. In aircraft operating at high speeds, the vibration problem exists, and hence an invention of the type herein disclosed has special application for use with equipment carried in aircraft.

The principal object of this invention is to provide an improved locking hook which avoids the possibility of becoming unlocked or unhooked by reason of vibrations to which the locked hook may be subjected.

Another object of this invention is to provide an improved locking hook which is easily manipulable by an operator using but one hand to unlock and open the hook either for hooking or unhooking action.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 3 is taken on line 3—3 of FIGURE 2.

Figure 1:
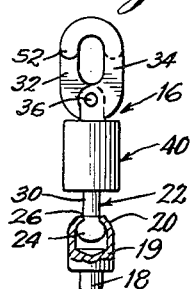
FIGURE 1 is a side elevation view of a cable member provided with the improved locking hook of this invention.
Figure 2:
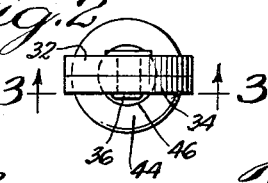
FIGURE 2 is an enlarged top plan view of the locking hook shown in FIGURE 1.

Referring now to the drawings, there is shown in FIGURE 1, as environment for the invention disclosed herein, an actuating cable generally indicated at 10, which carries at one end thereof an anchor element 12, and which is partially enclosed in a plastic sheath 14, and which is provided at its other end with a locking hook, generally indicated at 16. The end of the cable 10 adjacent the locking hook 16 has secured thereto a connector 18 having a tubular portion 19 with inturned flanges 20, for the purpose of providing a swivable connection between the connector 18 and the locking hook 16. Now, the combination of a cable plus a locking hook, as shown generally in FIGURE 1, is not new, but the details of the locking hook construction here disclosed embody the invention sought to be covered.

Turning now to the specific construction of the locking hook 16, it will be seen that said hook includes an elongated stem member 22 having formed at one end thereof connection means including a bulb portion 24 and an indented groove 26 adapted to cooperate with the inturned flanges 20 of the connector 18, to provide a swivable connection between the locking hook 16 and the cable 10. The stem 22 is provided with an outwardly extending annular flange 28 located intermediate the ends of stem 22, and the flange 28 serves to divide the stem 22 into an upper stem portion 29 and a lower stem portion 30.

Figure 3:
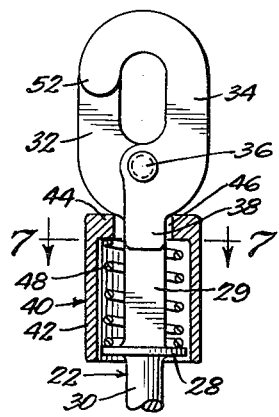
FIGURE 3 is an enlarged cross-section view of the locking hook showing the position of the parts when the hook is locked.
Figure 7:
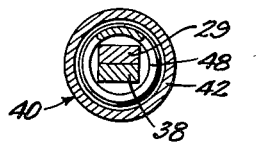
FIGURE 7 is a cross-section view taken on line 7—7 of FIGURE 3.

The upper stem portion 29 is elongated and is shaped to merge integrally with a laterally opening hook member 32 of modified C-shape. Said upper stem portion 29 and hook member 32 are generally flattened, and, as can best be seen in FIGURE 7, the cross-section of stem portion 29 is rectangular. There is provided a second laterally opening hook member 34 of modified C-shape, and the two hook members 32 and 34 are pivoted together by means of pin 36 in oppositely opening relation. The hook 34 carries a stub-like stem portion 38 which is of generally rectangular contour, as best seen in FIGURE 7, and which, when the hook members 32 and 34 are in the overlapping position of FIGURE 3, then the stub stem 38 extends axially of a portion of stem 22 and lies immediately adjacent a part of the upper stem portion 29. As seen in FIGURE 3, the stub stem 38 terminates in spaced relation to annular flange 28.

There is provided an inverted, cup-shaped lock member 40 having a cylindrical wall portion 42 and a transverse wall portion 44, said transverse wall portion being provided with a central aperture 46. There is also provided a coil spring 48 surrounding stem portion 29 and positioned between annular flange 28 and transverse wall portion 44 of the lock member 40. The spring 48 tends to normally bias the lock member 40 to the hook-locking position of FIGURE 3. The central aperture 46 in lock member 40 is of a size and shape to slidably receive the stem portions 29 and 38 of the hook members and to retain said hook members in the closed condition of FIGURE 3. By retracting the lock member 40 axially of stem 22 to the position of FIGURE 4, the stem portion 38 of hook member 34 is released, which permits of the relative pivoting between the hook members 32 and 34 to an open position as indicated in FIGURE 5, in which position a body to be hooked may either be entered or withdrawn between said open hook members.

Figure 4:
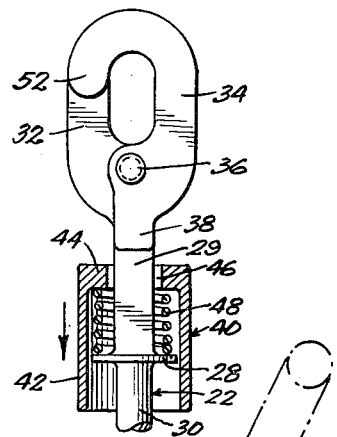
FIGURE 4 is a view similar to FIGURE 3 but showing the locking sleeve retracted to a position which permits of opening the hook.
Figure 5:
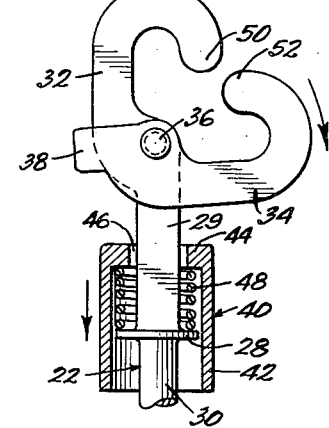
FIGURE 5 is a view similar to FIGURE 4 but showing the hook fully opened.

The arrangement of parts permits of manual actuation of the lock member 40 to the retracted position, and permits of the swinging of the hook members 32 and 34 to the full open position, by an operator using but a single hand; and after a body to be hooked has been entered between hook members 32 and 34 the parts may be swung back to the overlapping position of FIGURES 3 and 4, and the release of the lock member 40 results in return of that member to the full locked position of FIGURE 3 under the bias of spring 48.

Figure 6:
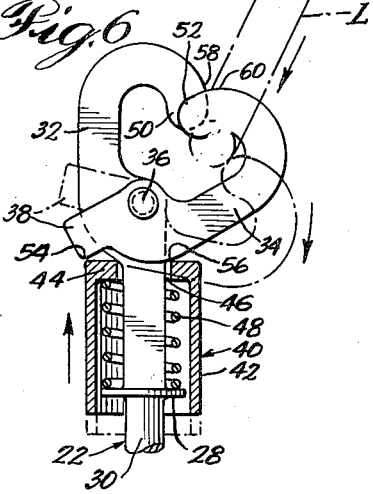
FIGURE 6 is a view similar to FIGURE 5 but showing the hook in a partially closed position with the parts of the hook biased to said position by the locking sleeve.

The arrangement here disclosed also permits of the positioning of the hook members 32 and 34 in an intermediate position, as best seen by the full lines in FIGURE 6, wherein the tips 50 and 52 of the hook members 32 and 34 are in overlapping relation, and wherein the spring-biased lock member 40 is in engagement with two points 54 and 56 on the swingable hook member 34, and with the said points of engagement 54 and 56 located on opposite sides of the axis of pivot pin 36. Such an intermediate position is a stable one, in that there is no inherent tendency of the parts to swing to the positions of either FIGURES 3 or 5.

The arrangement of the hooks 32 and 34 when in the intermediate position is such that there is provided overlapping inclined outer edges 58 and 60 on the hook members 32 and 34. By thrusting a link, or body, L against the inclined surfaces 58 and 60, it is possible to cam the hook members 32 and 34 apart against the resilience of spring 48 to permit entrance of the link L between the hook members 32 and 34, and the spring means 48 then operates to bias the hook members 32 and 34 back to the intermediate position shown in FIGURE 6. If it is necessary to fully lock the parts, the hook members may be moved to the position of FIGURES 3 and 4.

It will be understood that the simplified elements of this locking hook permit of rapid sliding retraction of lock member 40 to permit of opening of the locking hook, and the spring means 48 operates to keep the hook members 32 and 34 in their stable position of either FIGURE 3 or 6, while avoiding the possibility that vibrations may act to work the lock member 40 loose, thereby permitting inadvertent opening of the locking hook.

While there has been shown and described a particular embodiment of this invention, it will be obvious to those skilled in the art that various changes and modifications may be made therein without departing from the invention and, therefore, it is intended in the appended claims to cover all such changes and modificatiins as fall within the true spirit and scope of the invention.

What I claim as new, and desire to secure by Letters Patent of the United States, is:

1. An improved lock for a locking hook which includes a pair of opposite opening hook members pivoted to each other to move between open-hook and closed-hook positions, and which hooks have stem portions which are spaced from the pivot of said hook members and which extend coextensively when the hook members are closed; said improved lock comprising an annular flange on a first stem extending from one hook member, the stem on the second hook member extending axially of said first stem when the hook members are closed and terminating in spaced relation from said flange, a lock member having a sleeve portion slidably mounted on said first stem and having an apertured transverse wall for slidably receiving therein the stems of said hooks to maintain said locking hook in closed-hook condition, said sleeve portion being movable on said first stem to a position wherein said second hook stem clears said lock member, for pivoting said second hook stem to a stable intermediate position of said locking hook between said open-hook and closed-hook positions, spring means normally biasing said lock member toward hook-locking position, said pair of hook members being pivotable from a closed-hook position when said stems are aligned to an open-hook position wherein said hook members are open to afford unobstructed entrance and exit between said hook members of a body to be hooked; and in said stable intermediate position said hook members being only partly pivoted to be spread from said closed-hook position but still presenting overlapping hook portions that block entrance to the inside of said hook members and said lock member engaging spaced portions of said pivotable second hook member to resiliently maintain said hook members in said intermediate position.

2. An improved lock for a locking hook which includes a pair of oppositely opening hook members arranged to pivot relative to each other between open-hook and closed-hook positions, and which hooks have coextensively extending stem portions; said improved lock comprising an annular flange on a first stem extendng from one hook member, the stem on the second hook member extending axially of said first stem and terminating in spaced relation from said flange, a lock member having a sleeve portion slidably mounted on said first stem and having an apertured transverse wall for slidably receiving therein the stems of said hooks, to maintain said locking hook in closed-hook condition, said sleeve portion being movable on said first stem to a position wherein said second hook stem clears said lock member, for pivoting said second hook stem to a stable intermediate position of said locking hook between said open-hook and closed-hook positions, spring means normally biasing said lock member toward hook-locking position, said pair of hook members being pivotable from a closed-hook position when said stems are aligned to an open-hook position wherein said hook members are open to afford entrance and exit between said hook members of a body to be hooked; and in said stable intermediate position said hook members being partly spread from said closed-hook position but still presenting overlapping hook portions that block entrance to the inside of said hook members and said lock member engaging spaced portions of said pivotable second hook member to resiliently maintain said hook members in said intermediate position, said hook members when in said intermediate position presenting cam surfaces which provide for effecting spreading of said hooks, against the bias of said spring means, to said open-hook position, by pressure of the body to be hooked against said cam surfaces.

References Cited in the file of this patent
UNITED STATES PATENTS

| | | |
|---|---|---|
| 790,105 | Cavanaugh | May 16, 1905 |
| 820,383 | Ashland | May 15, 1906 |
| 1,262,974 | Pearen | Apr. 16, 1918 |
| 1,299,821 | Hancock et al. | Apr. 8, 1919 |
| 2,276,628 | Quilter | Mar. 17, 1942 |

FOREIGN PATENTS

| | | |
|---|---|---|
| 18,471 | Switzerland | Mar. 17, 1899 |